United States Patent [19]

Carasso et al.

[11] 4,410,877
[45] Oct. 18, 1983

[54] METHOD OF CODING DATA BITS ON A RECORDING MEDIUM, ARRANGEMENT FOR PUTTING THE METHOD INTO EFFECT AND RECORDING MEDIUM HAVING AN INFORMATION STRUCTURE

[75] Inventors: Marino G. Carasso; Wilhelm J. Kleuters; Johannes J. Mons, all of Eindhoven, Netherlands

[73] Assignee: U.S. Philips Corporation, New York, N.Y.

[21] Appl. No.: 179,338

[22] Filed: Aug. 18, 1980

[30] Foreign Application Priority Data

Jun. 16, 1980 [NL]  Netherlands ............... 8003474

[51] Int. Cl.$^3$ .................. H03K 13/02; G11B 5/09
[52] U.S. Cl. ..................... 340/347 DD; 360/40; 360/44; 369/59
[58] Field of Search ............ 360/39, 40; 340/347 DD; 369/275, 59

[56] References Cited

U.S. PATENT DOCUMENTS

| 4,027,335 | 5/1977 | Miller | 360/40 |
| 4,032,979 | 6/1977 | Rice | 360/40 |
| 4,183,066 | 1/1980 | Anderson | 360/40 |
| 4,233,626 | 11/1980 | Bell | 369/275 X |
| 4,234,897 | 11/1980 | Miller | 360/40 |

OTHER PUBLICATIONS

Mallinson et al., Optimal Codes for Digital Magnetic Recording, The Radio and Electronic Engineer, vol. 47, No. 4, 4/1977, pp. 172/176.

Primary Examiner—T. J. Sloyan
Attorney, Agent, or Firm—Thomas A. Briody; Robert T. Mayer; Algy Tamoshunas

[57] ABSTRACT

"Method of coding data bits on a recording medium, arrangement for putting the method into effect and recording medium having an information structure."

The so-called Miller modulation has the disadvantage that a direct current is generated in the information channel. When this modulation method is used for magnetical or optical recording, the result is that the amplitude values and the zero crossings are deformed as these channels cannot transmit direct current.

According to the invention, in order to obtain, a d.c. free modulation, the Miller modulation concept is modified such that sequences of data bits which, after coding, result in the introduction of a d.c. component are coded differently. It appears that, the frequency zero excepted, a good suppression of the response is obtained also in a fairly wide low-frequency portion of the spectrum.

The invention further relates to an arrangement for putting the method into effect and to a recording medium, for example an optical disc, having an information structure which is coded by means of the d.c.-free coding.

4 Claims, 9 Drawing Figures

METHOD OF CODING DATA BITS ON A RECORDING MEDIUM, ARRANGEMENT FOR PUTTING THE METHOD INTO EFFECT AND RECORDING MEDIUM HAVING AN INFORMATION STRUCTURE

The invention relates to a method of coding a stream of data bits in consecutive bit cells of a recording medium, it being considered that the bit stream is assembled from consecutive words of a first type and a second type and that the data bits are of a first type or a second type, the second type of words comprising at least a sequence of: one data bit of the second type followed by m, (m≧0) data bits of the first type, data bits of the first type normally being encoded by level transitions in the middle of the relevant bit cell and data bits of the second type normally being encoded by transitions at the beginning of the relevant bit cell, while the transition at the beginning of a bit cell following after a transition in the middle of the immediately preceding bit cell is suppressed and of words of the second type with even m, the transitions introduced by the last and the second last data bit of the first type being modified in order to remove every d.c. component.

Such a method is described in the article: "Optical codes for digital magnetic recording" by J. C. Mallinson and J. W. Miller, published in: "The Radio and Electronic Engineer," Vol. 47, no. 4, pages 172–176, April 1977.

Data in binary form are assembled from data bits which comprise the information in the form of either the one or the other of two types. One type is sometimes represented as a "logic one," as "true," as "yes" or as "+" and the other type is sometimes represented as a "logic zero," as "not true," as "no" or as "−". In order to transmit these data bits via a transmission channel or to record them on magnetic tape or an optical disc, the data bits are usually modified—an operation which is known as channel coding. The object of this channel coding is, for example, to obtain the highest possible information density on the recording medium or to reduce the d.c. content of the encoded signal to zero, without enlarging the required bandwidth.

Each encoded data bit is accommodated in an interval, denoted bit cell. This bit cell may be a time interval (when transmitted via an information channel) or a space interval (when recorded on tape or a disc).

A known manner of channel encoding is the so-called Miller modulation. The code rules thereof are: a data one is coded as a level transition in the middle of a bit cell, and a data zero results in a transition at the beginning of the bit cell, except for the case where the logic zero follows after a logic one. The Miller code, alternatively known as "delay modulation" is, therefore, a binary code in which the location of the transitions between two levels defines the meaning of the binary information.

For the invention it is unimportant which transition is associated with a "logic one" and which transition is associated with a "logic zero." In addition, the exact location of the transitions in the bit cell is of no importance: one transition comparatively early and one transition comparatively late in the bit cell—provided they can be unambiguously distinguished from one another—is a further useful alternative.

However, the penalty of Miller modulation is that a direct current is generated in the information channel or on the record carrier. To prevent this it has been proposed (see paragraph 4.7 of the above-mentioned article) to consider the stream of data bits as having been assembled from sequences of data bits of two types, namely (a) 011...110 (one zero, n ones and one zero, wherein $n \geq 0$) or (b) 111...111; m ones.

Since only the words of type (a) where n is even, contribute to a d.c. component, these words are modified such that the direct current contribution is eliminated. All other words are direct current free and are coded in the customary Miller method. The Miller code modified in this manner, indicated as $M^2$ in the further course of this description, has a d.c.-free spectrum and the very low frequencies of this spectrum are suppressed to a certain extent as compared with the spectrum of the Miller code. A special problem is encountered when this code is used to record information on an optical disc. Handling this disc may cause, for example, scratches in the disc surface or fingerprints may remain on the surface. When the recording medium is played, such surface blemishes are converted into low frequency noise signals on the information channel. Because of the above-mentioned low frequency spectrum properties, these noise signals are indeed somewhat suppressed. However, in practice it appeared that the frequency band which is suppressed is too narrow and the suppression in that band is too small.

It is an object of the invention to provide a method of coding data bits on a recording medium by means of which a d.c.-free, self-clocking coding is obtained.

According to the invention, the method of coding data bits on a recording medium is therefore characterized in that the transition in the middle of the bit cell corresponding to both the last and the second last data bit of the first type of the second type of word with even m are suppressed and that a transition is located at the boundary between that said second last and the last data bit.

A further object of the invention is to provide a method of coding data bits on a recording medium such that the code results in a spectrum for the lower frequencies which offers an increased suppression over a relatively wide band and which has the above disadvantages to a smaller extent.

A preferred embodiment of the method in accordance with the invention is characterized in that the words of the first type consist of a sequence of $n(n \geq 1)$ data bits of the second type and that for the second type words $m \geq 1$.

The invention further relates to an apparatus for carrying out the preferred embodiment of the method of coding a stream of binary data bits in consecutive bit cells on a recording medium. The apparatus includes a first input for receiving the binary data bits, a second input for receiving clock signals which are in synchronism with the data bits and an output for taking off the encoded signals for the control device for converting signal transitions into transitions in the recording medium. The apparatus further comprises:

means for generating a signal transition in the middle of a clock interval for a data bit of the first type;

means for generating a signal transition at the beginning of a clock interval for a data bit of the second type;

means for suppressing a transition at the beginning of a clock interval following after a transition in the middle of the immediately preceding clock interval.

A further object of the invention is to provide an arrangement with which the preferred embodiment of the method according to the invention is implemented in a simple manner. According to the invention the arrangement is therefore characterized in that it comprises:

means for detecting a second type word with m is even in the data bit stream;

means for indicating the second last and the last data bit of the first type in a second type word with m is even;

means for suppressing the transitions in the middle of the clock interval corresponding to the said second last and last bits of the first type in a second type word with m is even;

means for generating a transition between the said second last and the last clock interval.

The invention further relates to a recording medium having an information structure. The recording medium according to the invention has an information structure characterized in that the minimum distance between two consecutive transitions is equal to the length of one bit cell, that the maximum distance between two consecutive transitions is equal to the length of three bit cells, that a transition in the middle of the bit cell represents a "logic one" and that a transition at the beginning of a bit cell normally represents a "logic zero" unless one and the same level is present across two consecutive bit cells in which case the first of the said two consecutive bit cells and the preceding bit cell each represent a "logic one," that the level transitions are effected between a first and a second level, the first level being positive for the same amount with respect to a reference level as the second level is negative and that the running integral of the information structure along the reference level reaches a value of not more than 3/2 T, T being the length of a bit cell, and that the level transitions which are separated from one another by the maximum distance of three bit cells mark the beginning of the bit cell.

The invention and its advantages will not be further explained with reference to the accompanying drawing in which.

Corresponding elements in the Figures. have been given the same reference symbols.

Figure 1:
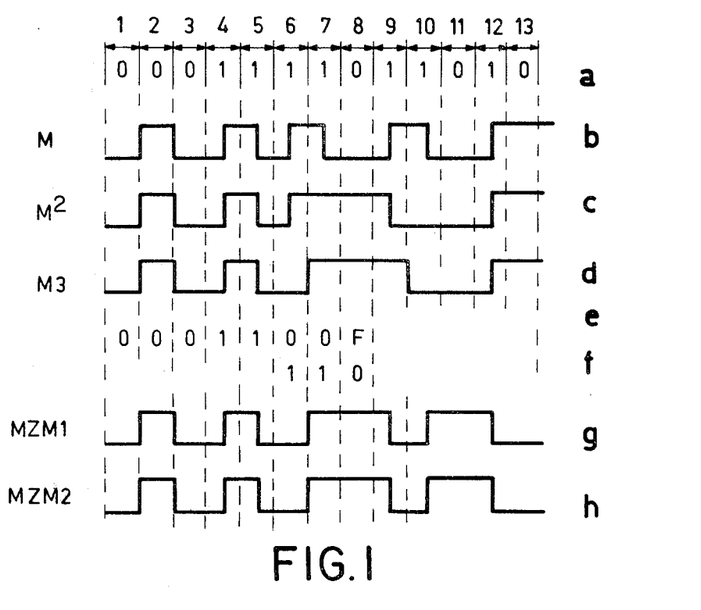
FIG. 1 shows a number of binary signal waveforms which illustrate known codings and the coding according to the invention.
Figure 2:
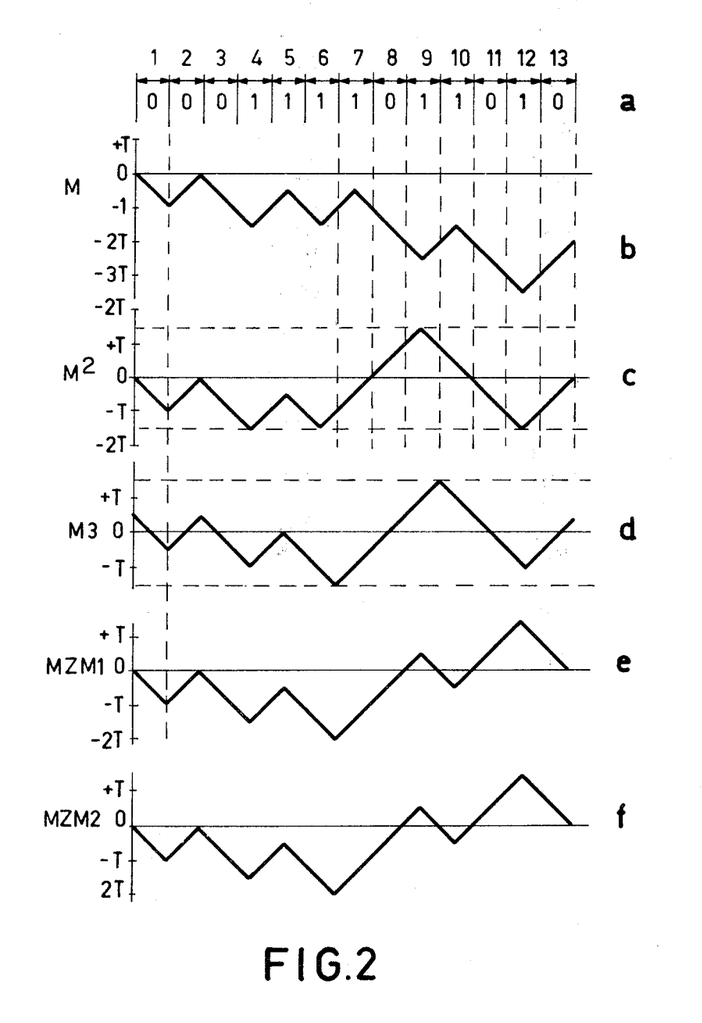
FIG. 2 shows a number of waveforms representing the integral of the signal waveforms shown in FIG. 1.

FIGS. 1a and 2a show a number of consecutive sequential bit cells 1, 2, 3, ... 13, in which binary information signals can be stored, one bit in each bit cell. An information bit can be represented in different ways. The known Miller code will code a data bit having a logic content "1" as a level transition in the middle of a bit cell and an information bit having a logic content "0" will be coded as a transition at the beginning of a bit cell, while each transition at the beginning of a bit cell following after a transition in the middle of the immediately preceding bit cell is suppppressed. FIG. 1b shows how the exemplary binary sequence, of FIG. 1a looks after Miller coding. As is known, recording equipment (magnetic, optical) are generally not capable of reproducing signals of a very low frequency or even direct current signals. It is therefore desirable to have a coding scheme which modifies the binary information signal so that the limitations of the recording equipment affect the quantity and the quality of the signals to be recorded to the lowest possible extent. The Miller code discussed above is not d.c. free as shown in FIG. 2b. FIG. 2b shows the so-called d.s.v. (digital sum variation), that is to say, the running integral of the surface below the coded data, it being assumed that the binary levels are +1 and −1, respectively. The length of each bit cell is equal to T. It should be noted that the integral returns to zero at the end of the second bit cell. Thereafter the integral remains negative and becomes even more and more negative. This illustrates the introduction of a d.c. component.

In order to obtain d.c.-free coding, J. C. Mallinson and J. W. Miller proposed in the article "Optimal codes for digital magnetic recording" published in the periodial "The Radio and Electronic Engineer," Vol. 47, no. 4, April 1977, pp. 172–176, to modify the Miller code as follows. The stream of data bits in consecutive bit cells is assumed as having been assembled from consecutive words of a first type and a second type. The word of a first type consists of a sequence of n data bits, each of a first type, consequently 11...111; n ones, n≧1. The word of the second type consists of n ones bounded on both sides by a 0, consequently 011...110; m ones, m≧0. The words of the first type consist of bits which, after having been Miller coded, do not contribute a net contribution to the d.s.v. and these words are therefore coded by means of the Miller method. Likewise, the words of the second type wherein n=odd, do not contribute, after Miller coding, a net contribution to the d.s.v. and this category of second type words is also ignored. However, the words of the second type wherein n is even, contribute, if Miller coded, a net contribution, which is unequal to zero to the d.s.v. In the example of FIG. 1, the bit cells 3 through 8 comprise such a word of the second type, wherein m=even (namely 011110). As mentioned above, the four ones of this word do not contribute towards the d.s.v., but the zero preceding the one has the same polarity as the zero following after the ones and together they contribute a net contribution to the d.s.v. When the number of ones between the two zeros is odd, then the polarity of the zero preceding the ones is opposite to the polarity of the zero following after the odd number of ones and the contribution towards the d.s.v. is 0. In the above-mentioned article it is proposed to suppress one transition in the words of the second type where m=even, namely the transition in the middle of the bit cell which corresponds to the last 1. The Miller code modified in this manner, denoted M² hereinafter, is d.c.-free, as is also apparent from FIG. 2c. FIG. 1c shows the M²-coded binary information: the transition which occurs in the Miller code in the middle of bit cell 7 (and 10) is suppressed in the M² code.

Figure 3A:
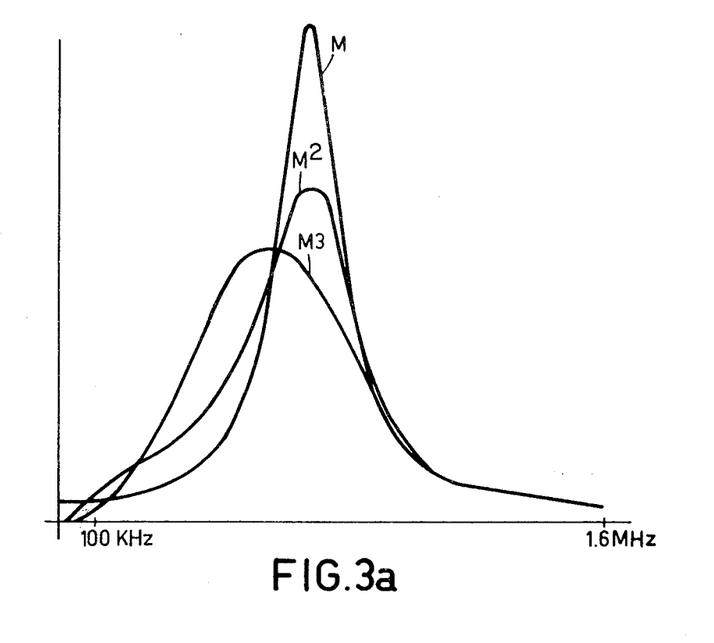
FIG. 3 shows the low-frequency portion of the spectrum of the Miller code, the $M^2$-code and the M3 code according to the invention.

When recording information signals on an optical carrier, for example a disc, a special problem is encountered. The surface of such a carrier may be damaged during use, for example, the disc may be scratched or particles of dust settle on it and the surface of the disc is soiled. These blemishes are converted into low-frequency noise signals when the disc is read (however, the magnitude of these noise signals is already limited by a rather thick protecting layer provided onto the disc, so that the blemishes are very often outside the depth of field range of the lens). The above-mentioned M² code has a spectrum which is d.c.-free and whose very low frequencies have been suppressed to a certain extent with respect to the spectrum of the Miller coding. FIG. 3a shows the spectrum of a pseudo-random bit stream which is coded in accordance with the Miller code (denoted M in FIG. 3a) or in accordance with the M² method (denoted M² in FIG. 3a). The Miller coding is not d.c. free, as is apparent from the contribution at frequency zero.

In practice it appeared that the suppression of noise signals provided by the M² coding outside the frequency 0 is too low and limited to too narrow a frequency band. It appeared to be particularly advantageous to modify the Miller code in a different manner, so that this code—as the M² coding—becomes d.c.-free but besides that also furnishes an improved noise signal suppression over a wider frequency band. This coding, denoted M3 in the further course of this description, is shown in greater detail in FIG. 1d. Let it be assumed that the data bit stream in consecutive bit cells is assembled from consecutive words of a first type and a second type. The first type of words consists of a sequence of n data bits each of a second type, consequently 000...00; n zeros, $n \geq 1$. The second type of words consists of m data bits of a first type, consequently 011...11, m ones, $m \geq 1$. The words of the first type are coded in accordance with the Miller code, which also applies to the words of the second type wherein m=odd. Sequences of words of these types furnish no net contribution to the d.s.v. (although the words of the first type itself with n=odd are not d.c.-free!) and will therefore not introduce a d.c. component. In contrast therewith, the words of the second type wherein m=even would introduce such a d.c. component and are therefore modified. This is caused by the fact that the transitions which would occur in the middle of the last and the second last data bit when coding were done in accordance with the Miller method, are suppressed and that a transition is introduced at the beginning of the last bit cell. On balance, there is one transition less in such a word than in the case of the Miller code. The polarity of the zero preceding the m ones (m=even) is consequently opposite to the polarity of the zero which follows after the m ones, which zero is also part of the next word of either the first or the second type. FIG. 1d shows that the transitions in the middle of bit cells 6 and 7 (the last bits of the word of the second type 01111 wherein m=even=4) have been suppressed and that a transition is introduced at the beginning of bit cell 7. The same applies to the word of the second type (0111) shown in bit cell 8, 9, 10. FIG. 2d shows the variation of d.s.v. for the M3 coding. The d.s.v. always returns to the value zero and the maximum deviation is $\pm 3/2$ T, T being the duration of a time interval and a data zero is assumed to be $-1$ and a data one to be $+1$.

Figure 3B:
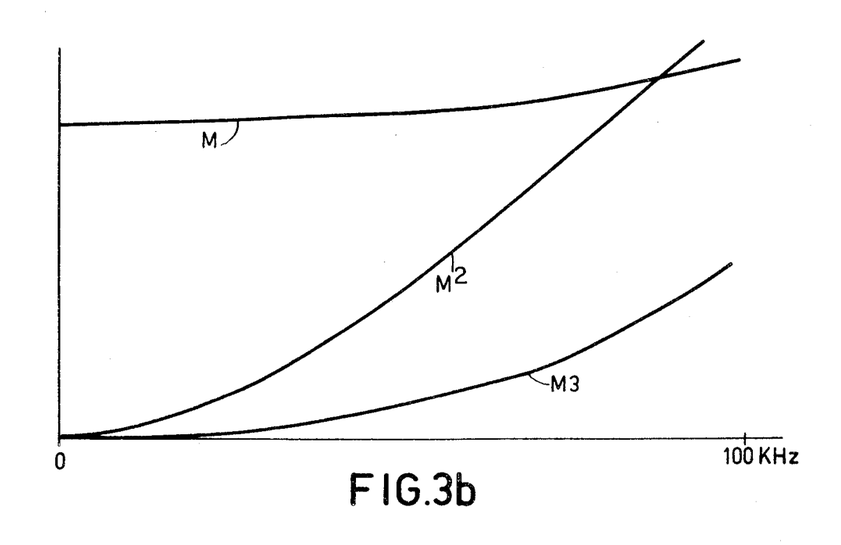

FIG. 3a also shows the spectrum of the M3 coding (denoted by M3). It will be obvious that M3 has very good properties in the low frequency range as regards the suppression of current components of a low frequency, since the response from frequency zero increases only slowly. FIG. 3b shows in greater detail the spectrum of Miller coding, M² and M3 to 100 kHz (the spectra shown in FIGS. 3a and 3b have both been measured at a bit rate of 2 Mbit/sec.).

Figure 4:
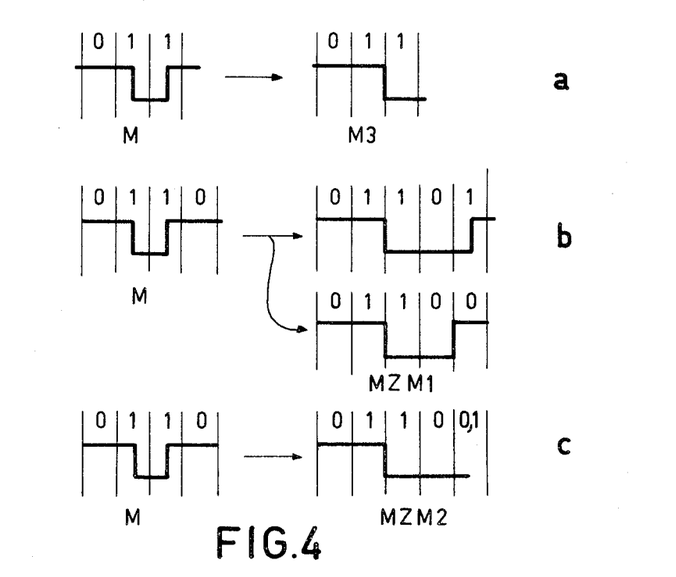
FIG. 4 shows the signal waveforms obtained by converting a non-d.c.-free Miller encoded word (011), which forms part of the binary information stream, in a d.c.-free word according to the invention in accordance with M3, MZM1 and MZM2, respectively.

A d.c.-free self-clocking coding is not only obtained in the manner shown in the above referred embodiment, but also in the manner shown in FIGS. 4b and 4c. The codings shown in FIG. 4b and FIG. 4c, denoted MZM1 and MZM2, respectively (modified zero modulation) in the further course of this description, provide for a division of the binary information stream into words of a first type and a second type. The first type of word consists of a sequence of n data bits, each of a first type, therefore 111...11, n ones, $n \geq 1$. The second type of word consists of a sequence of m data bits of the first type preceded and followed by a data bit of the second type, therefore 011...110 (0, m ones, 0 wherein $m \geq 0$). The words of the first type and the words of the second type wherein m is odd are d.c.-free and are coded by Miller rules. The words of the second type where n=even are not d.c.-free but are modified in the manner described above for M3 and shown again in FIG. 4a, namely by suppressing the transition in the middle of the bit cell which corresponds with the last and the second last data bit of the first type of that word and by introducing a transition between the said last and second last bit cells. In the MZM1 coding, shown in FIG. 4b, a transition is, in addition, introduced at the beginning of the first bit cell following after the modified word of the second type wherein m=even, when this bit cell must represent a logic 0. No transition at the beginning but a transition in the middle of the first bit cell is provided when this bit cell must represent a logic 1, as is otherwise customary in Miller coding.

The coding which is obtained by converting the binary bit stream shown in FIG. 1a in accordance with the MZM1 code is shown in FIG. 1g. The variation of the d.s.v. of the MZM1 sequence of FIG. 1g is shown in FIG. 2e.

In the MZM2 coding shown in FIG. 4c no transition is introduced at the beginning of the first bit cell following after the word of the second type wherein m=even.

The coding obtained by converting the binary bit stream of FIG. 1a in accordance with the MZM2 code is shown in FIG. 1h. The variation of the d.s.v. of the MZM2 sequence of FIG. 1h is shown in FIG. 2f.

Figure 5:
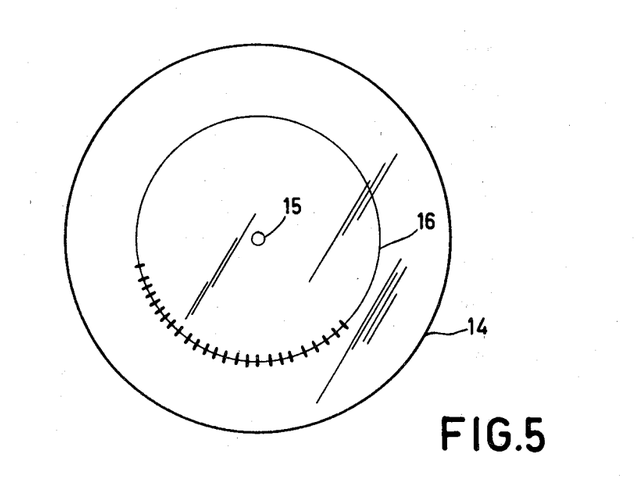
FIG. 5 is an elevational view of a recording medium provided with information tracks.

The data bit stream is coded by an arrangement still to be described, for example in accordance with the above-described M3 coding and is thereafter recorded on, for example, an optical carrier. In known manner, a one is represented by, for example, a pit or a hole in the carrier and a zero by the absence of such a bit or hole. FIG. 5 is an elevation view of an optical disc 14, a hole 15 having been provided in the centre thereof. Circular or spiral tracks 16 are provided in the disc, which tracks are formed by sequences of hole/no hole or bit/no bit. In FIG. 5 one circular track is shown in which, not to scale, a number of sub-division lines are shown to mark the bit cells. On the disc these bit cells form a spatial structure where they form a subdivision in time in the information signal.

A number of details can be distinguished on the recording medium, independent of the content of the information signals. These details will be further described hereinafter with reference to a recording medium having an information structure encoded in accordance with M3 rules. Between brackets the differences, if any, are indicated when a recording medium is coded in accordance with MZM1 or MZM2. Thus, the minimum distance between two consecutive transitions from pit/no pit to no pit/pit is equal to one bit cell (see in FIG. 1d bit cells 2 and 4). The maximum distance between two consecutive transitions is equal to three (MZM1:2½) bit cells (see in FIG. 1d the bit cells 7, 8 and 9). In addition, there are distances which are located between these two extremes, namely distances of 1½, 2 and 2½ times the length of one bit cell (MZM1:1½ and 2). As the maximum distance is relatively short, a sufficient number of transitions are always present in the signal to be read from the medium, so that the coding may be designated a self-clocking code. Since, on the other hand, the minimum distance is not less than the length of one bit cell, a satisfactory information density can be realized on the medium. Another characteristic of the patterns present on the recording medium is that the transition which marks the beginning of the maximum distance of three bit cells is always located at the beginning of a bit cell. The same applies (MZM1 excepted) also for the transition which marks the end of the maximum distance. In this manner it can be determined unambiguously on the medium which transitions must be assumed to be located in the middle of a bit cell and which ones at the beginning of a bit cell. In addition, an essential feature is that the modification effected in order to obtain a d.c. free and low-frequency poor coding can be unambiguously decoded, since because of the modification, the two last ones of a word of the type 011...11 m ones wherein m=even are displayed as if they were zeroes. However, using transition/non-transition patterns which are only present on the recording medium this can be determined unambiguously. If, namely, an "impossible" bit value is found in the decoding under Miller rules then this bit should have a value "zero" and the two preceding bits—which were indicated as being "zero"—must get the value "one." All this is illustrated in FIG. 1e. The waveform shown in FIG. 1d is decoded in accordance with the known Miller method, which results for the bit cells 1 through 7 in 0001100 and in bit cell 8 in a 0, which, however, cannot be zero since, in accordance with the Miller coding a zero which follows after a zero should have a transition at the beginning of the bit cell, a transition which is missing here. The result of decoding bit cell 8 is represented in FIG. 1e by a F. By substituting a zero for the bit cell indicated by F and a "one" for the two bit cells immediately preceding it, as indicated in FIG. 1f the decoded data signal becomes identical to the coded data signal.

Figure 6:
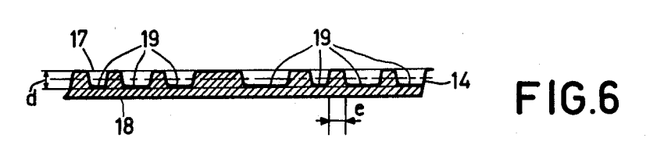
FIG. 6 is a cross-sectional view of the recording medium according to the invention in the direction of an information track having pits, the transitions between pits and non-pits being relevant to the coded information.

A further particularity embodied in the recording medium will now be described with reference to FIG. 6. FIG. 6 is a perpendicular cross-sectional view of the recording medium as shown in, for example, FIG. 5, the cross-sectional view extending in the direction of a track. A plurality of pits 19 have been provided in the surface 17 of the recording medium 14. The pits are spaced by lands in the track direction so that the pit/no pit pattern formed thus represents the binary information recorded in that track. In the example shown, the bottom of the pits 19 does not touch the bottom side 18 of the recording medium, although this might be possible. The pits have a depth equal to d. The dash-and-dot line in FIG. 6 is located at a distance d/2 from the top 17 of the recording medium. For the information shown on the medium in M3 code it holds that the surface area of the "no bit"-portion, i.e. the surface area of the lands above the dash-and-dot line is on average equal to the surface area of the "pit" portion below the dash-and-dot line. It further holds that the surface of the "no pit" portion above the dash-and-dot line deviates for not more than ±3/2 T.d/2 (MZM1 and MZM2: ±Td) from the surface area of the "pit" portion below the dash-and-dot line, T being the length of a bit cell on the medium. As mentioned in the foregoing, both properties are independent of the information which relates to the relevant (portion of a) track or relevant tracks. It has been assumed, however, that the surface area of a "no pit" or land above the dash-and-dot line in FIG. 6 which has a length of one bit cell is equal to the surface area below the dash-and-dot line of a "pit" which has the length of one bit cell.

It will be obvious that in achieving the objects of the invention, it does not make any difference which one of the two states is denoted "1" and which one is denoted "0." Thus, a transition in the middle of the bit cell may be denoted "0," in contrast to the terminology used in the foregoing, and a transition at the beginning of the bit cells may be denoted "1." It is also conceivable that a logic "1" is represented by a transition relatively late in the bit cell and a logic "0" is represented by a transition relatively early in the bit cell or vice versa. For the invention it is also irrelevant whether a "1" or a "0" is associated with a pit or with a land in the recording medium.

Figure 7:
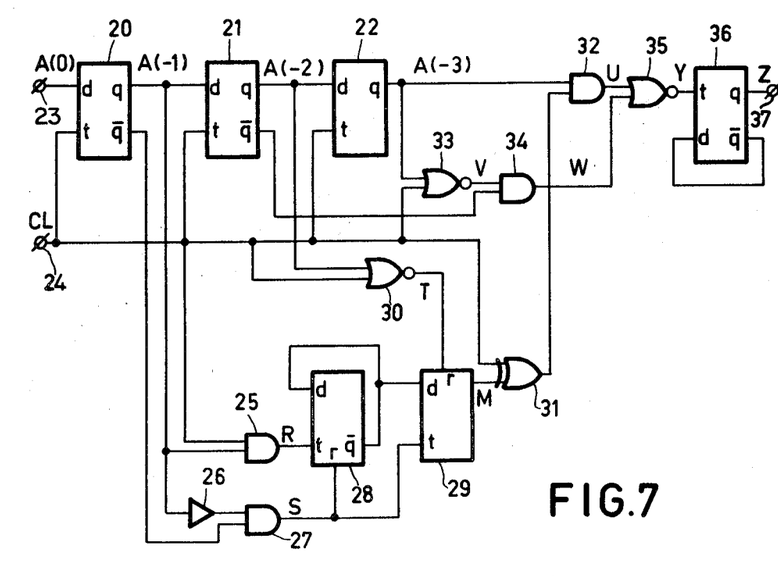
FIG. 7 shows an embodiment of an arrangement for coding information signals in accordance with the M3 code according to the invention.
Figure 8:
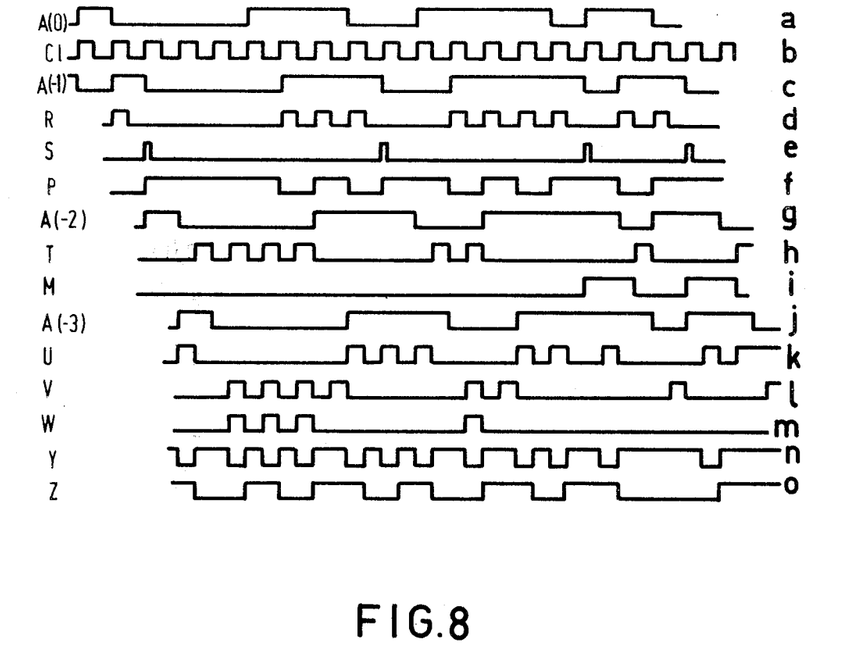
FIG. 8 shows some time diagrams of signals occurring in the arrangement shown in FIG. 7.

A preferred embodiment of an arrangement for coding binary information signals in the above-described M3 code is shown in FIG. 7. FIG. 8 shows some time diagrams of the signals occurring in the indicated positions in the arrangement of FIG. 7. The arrangement comprises three cascaded D-type trigger circuits (flip-flops) 20, 21 and 22. The input terminal 23 to which the binary information signals are applied is connected to the D-terminal of trigger circuit 20. The Q-terminal of trigger circuit 20 is connected to the D-terminal of trigger circuit 21 and the Q-terminal of trigger circuit 21 is connected to the D-terminal of trigger circuit 22. The arrangement further comprises an input terminal 24 to which clock signals C1 are applied which are generated by a known clock generating device, not shown, and are shown in FIG. 8b. The input terminal 24 is connected to the clock terminals T of the trigger circuits 20, 21 and 22. The cascade arrangement of the trigger circuits 20, 21 and 22 functions as a delay line, each trigger circuit delaying the data signal applied to the relevant D-terminal by one clock period. The binary information signal A (0) applied to the input terminal 22 and consisting of, for example, 1000011100011110110, as is also shown in FIG. 8a, appears therefore delayed by one clock period A(−1) at the Q-terminal of trigger circuit 20, see FIG. 8c, appears delayed by two clock periods A(−2) at the Q-terminal of trigger circuit 21, see FIG. 8g, and appears delayed by three clock periods A(−3) at the Q-terminal of trigger circuit 22, as shown in FIG. 8j.

The Q-terminal of trigger circuit 20 and the input terminal 24 and connected to an input of an AND-gate circuit 25. At the output of the AND-gate 25 a signal R is available, (FIG. 8d). Signal R thus corresponds to the clock signal C1 in those positions where the data signal A(−1) is equal to 1. The Q-terminal of trigger circuit 20 is further connected to an input of an AND-gate 27 via a delay element 26. The outher input of AND-gate 27 is connected to the $\overline{Q}$-terminal of trigger circuit 20. A signal S is available at the output of AND-gate 27 (FIG. 8c), this signal having needle pulses in the region of the negative-going edges of the data signal A(−1) (FIG. 8e). The output of AND-gate 25 is connected to the T-terminal of a further D-type trigger circuit 28 and the output of AND-gate 27 is connected to the R-terminal of trigger circuit 28. The $\overline{Q}$-terminal of trigger circuit 28 is fed back to the D-terminal. The triggeer circuit 28 is therefore connected as a divide-by-2 divider and produces a signal P, shown in FIG. 1f, at the $\overline{Q}$-terminal.

The $\overline{Q}$-terminal of trigger circuit 28 is further connected to the D-terminal of a D-type trigger circuit 29, the T-terminal of which is connected to the output of AND-gate 27. The reset terminal R of trigger circuit 29 is connected to the output of a NOR-gate 30, the inputs of which are connected to the Q-terminal of trigger circuit 21 and the clock input 24, respectively. The output signal T of the NOR-gate 30 is equal to the inverse of the clock signal in those positions where the data signal A(−2) is equal to zero. The output signal M of trigger circuit 29 is shown in FIG. 7i. The output signal M is of such a nature that the signal is zero in those positions where the signal to be coded must be coded according to the Miller rules and one in those positions where the signal should be coded in accordance with the M3 rules.

The Q-terminal of trigger circuit 29 is connected, as is also the input terminal 24, to an EXCLUSIVE-OR gate 31. The output signal of the EXCLUSIVE-OR circuit 31 is applied, as is also the signal A(−3) (FIG. 8j), to an AND-gate 32. The output signal U of the AND-gate 32 is shown in FIG. 8k. The signal U comprises clock pulses in those positions where the (delayed) data signal A(−3) has the value one, however with the proviso that in those positions where also the signal M has the value one, the clock pulses have been inverted.

The Q-terminal of trigger circuit 22 is further connected to an input of a NOR-gate 33. A further input is connected to the clock input 24. The output signal V (FIG. 8l) of the NOR-gate 33 is applied, together with the $\overline{Q}$-signal of trigger circuit 21 to AND-gate 34. A signal W as shown in FIG. 8n is available at the output of the AND-gate 34. Each output of AND-gates 32 and 34 is connected to an input of a NOR-gate 35 at the output of which a signal Y is available (FIG. 8n). Finally, the signal Y is applied to the T-terminal of a D-type trigger circuit 36. The $\overline{Q}$-terminal of this trigger circuit is connected to the D-terminal thereof. The trigger circuit 36 is consequently connected as a divide-by-two divider. Available at an output terminal 37, which is connected to the Q-terminal of trigger circuit 36 is the output signal Z which is shown in greater detail in FIG. 7o and which is the M3 coded version of the data input signal A(o) applied to the input terminal 22 and which has been shifted for three bit intervals. The output signal Z is utilized as, for example, a control signal for a laser which burns pits or holes in the recording medium.

Which one of the described coding methods, M3, MZM1 or MZM2 should be preferred must be based on a process or careful consideration of the different features, such as, for example, the nature of the system (optical, magnetical), the maximum length without transitions which is considered acceptable in the coded bit stream, and the desired suppression for low frequencies.

What is claimed is:

1. A method of encoding a stream of data bits of a first and second type as level transitions or absence thereof in consecutive bit cells each of which is associated with a respective one of said data bits in said stream, said stream being comprised of consecutive words of a first and second type, said words of said first type being defined by one or more consecutive bits of said second type and said words of said second type being defined by one data bit of said second type followed by one or more consecutive bits of said first type, said method comprising the steps of:

producing a level transition in the middle of an associated bit cell upon occurrence of a data bit of said first type in said stream, producing a level transition in the beginning of an associated bit cell upon occurrence of a data bit of the second type in said stream unless said second type data bit immediately follows a data bit of said first type in said stream, in which event no transition is produced in the bit cell associated with that second type bit, and upon occurrence of a word of said second type having an even number of data bits of said first type, producing a transition at the boundary between the two bit cells associated with the last and second last first type data bit of that word while suppressing the production of a transition in the middle of each of said two bit cells so as to remove d.c. components therefrom.

2. A method of encoding a stream of data bits of a first and second type as level transistions or absence thereof in consecutive bit cells each of which is associated with a respective one of said data bits in said stream, said stream being comprised of consecutive words of a first and second type, said words of said first type being defined by one or more consecutive bits of said first type and said words of said second type being defined by a single data bit of said second type immediately followed by a sequence of m consecutive data bits of said first type, where m is equal to or greater than zero, which sequence is immediately followed by a single data bit of said second type, said method comprising the steps of:

producing a level transition in the middle of an associated bit cell upon occurrence of a data bit of said first type in said stream, producing a level transition in the beginning of an associated bit cell upon occurrence of a data bit of the second type in said stream unless an immediately preceding bit cell contains a transition in the middle thereof, in which event no transition is produced in the bit cell immediately following said preceding bit cell, and upon occurrence of a word of said second type having an even number of data bits of said first type, producing a transition at the boundary between the two bit cells associated with the last and second last data bit of said first type in said sequence of that word while suppressing the production of a transition in the middle of each of said two bit cells and suppressing the production of a transition at the beginning of the bit cell associated with the last second type data bit of that word so as to remove d.c. components therefrom.

3. The method according to claim 2 wherein the production of a transition in the bit cell associated with the first data bit of a word which immediately follows a word of said second type having an even number of data bits of said first type is suppressed.

4. An apparatus for encoding a stream of binary data bits of a first and second type as signal level transitions or absence thereof in consecutive bit cells defined by consecutive intervals of a clock signal, said stream of data bits being comprised of consecutive words of a first and second type, said words of said first type being defined by one or more bits of said second type and said words of said second type being defined by one bit of said second type followed by one or more consecutive bits of the first type, said apparatus having a first input for receiving the stream of data bits and a second input for receiving the clock signal which is in synchronism with the data bits, said apparatus further comprising means for generating a signal transition in the middle of a clock interval upon occurrence of a data bit of the first type in the stream, means for generating a signal transition at the beginning of a clock interval upon occurrence of a data bit of the second type in said stream, means for suppressing said generation of a transition at the beginning of a clock interval when a data bit of said second type immediately follows a data bit of said first type in said stream, means for detecting a word of said second type having an even number of said data bits of said first type, means for indicating the second last and the last data bit of said first type in said word with said even number of first type data bits, means for suppressing the generation of transitions in the middle of the clock interval associated with said last and second last bit, and means for generating a transition between said clock intervals associated with said last and second last bits.

* * * * *